Figure 1:
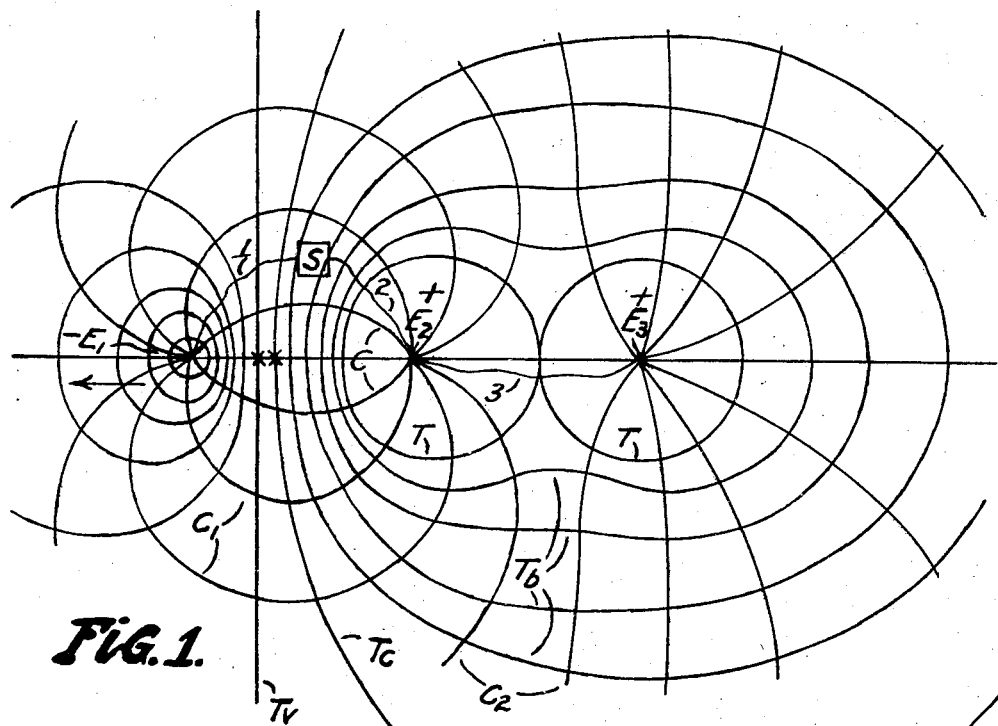

Aug. 14, 1945.  S. R. PHELAN  2,382,093
METHODS FOR MAKING GEOPHYSICAL SURVEYS
Filed March 7, 1942  2 Sheets-Sheet 1

INVENTOR.
STEPHEN R. PHELAN
BY
ATTORNEY.

Aug. 14, 1945.　　　S. R. PHELAN　　　2,382,093
METHODS FOR MAKING GEOPHYSICAL SURVEYS
Filed March 7, 1942　　2 Sheets-Sheet 2
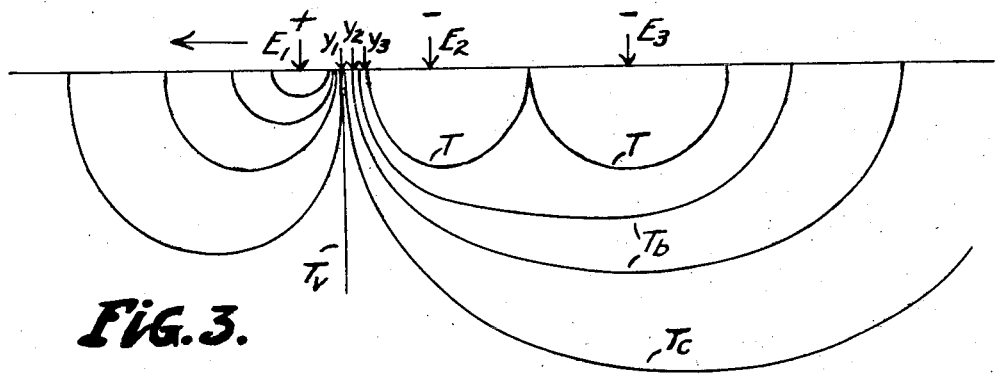
Fig.3.
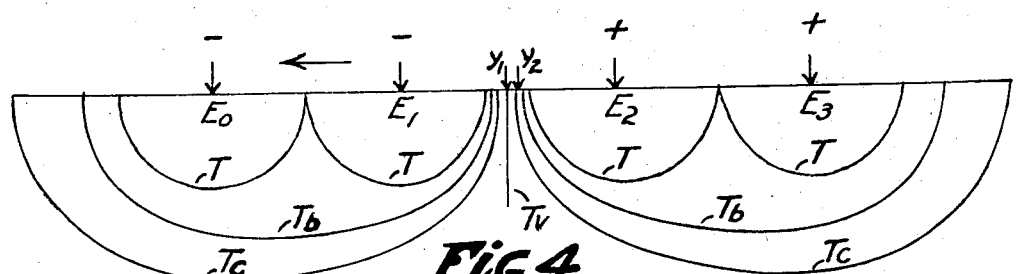
Fig.4.
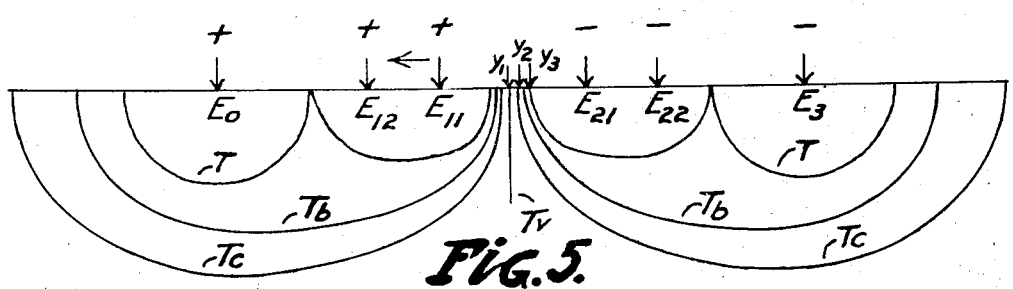
Fig.5.
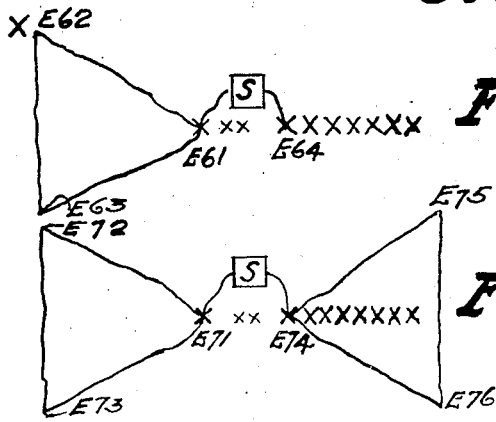
Fig.6
Fig.7.
INVENTOR.
STEPHEN R. PHELAN
BY
ATTORNEY.

Patented Aug. 14, 1945

2,382,093

UNITED STATES PATENT OFFICE 2,382,093

METHOD FOR MAKING GEOPHYSICAL SURVEYS

Stephen R. Phelan, Memphis, Tenn.

Application March 7, 1942, Serial No. 433,702

1 Claim. (Cl. 175—182)

This invention relates to geophysical prospecting, and particularly to modifications, advances, and improvements in the method described in my application, Serial No. 309,177, filed December 14, 1939, Patent No. 2,314,597, issued March 23, 1943.

The present invention, therefore, likewise concerns electrically exploring the condition of subsurface strata or anomalies to determine the depth, nature and extent thereof. Especially do I explore deep strata from the ground surface. For this purpose, component similar-sense flows of electricity through the earth form a more vertical, penetrative, parallel, resultant flow, and electrical graphs may be taken on the ground surface to electrically log the strata below.

The novel features of this invention relate to (1) certain methods now preferred among the electrical prospecting methods heretofore described by me, because they maintain stationary surface pick-up means in conjunction with moving, preferably in a progressive fashion, a part or all of the particular multiple surface current-introduction means described heretofore and herein; (2) a novel subordinate electrical prospecting method within a similar master electrical prospecting method such as previously described, termed a "pick-up control configuration"; (3) methods, (1) and (2) used together. Introduction means comprises the equipment for introducing current into the earth, and may often, but not always, be electrodes of introduction driven therein. Pick-up means comprises equipment for search of said current flow or its consequent effects. It may be search coils and other field exploratory devices, but frequently is electrodes of pick-up driven in the earth.

Simple flow of electricity in the earth between two surface electrodes or induced by a surface loop, or by less customary means, and pick-up by surface electrode, search coil or loop, or other less customary means, are known. Such introduction and pick-up, also, within drill holes, to electrically log the strata locally and in detail at the holes are familiar. For this invention, however, a combination of simple flows, said combination being derived from surface introduction by grouping similar-sense flows and by comparative current equalization of each to each, provides a repellent, parallel, penetrative current flow to depth. Reading may be taken by surface pick-up means reading any particular quantity created by such flow. Preferably, however, by drawing for reading an electrical log based on simple resistance or impedance pick-up values, or on ratios of any one of the two, electrical logging distinction of a surface, geological and prospecting, rather than of a detailed and local production use in a drill hole, is achieved. While this invention greatly is used to distinguish valuable strata and other desirable strata, including oil and gas strata with enough oil and gas to justify drilling, hard limestone strata, water strata, and salt-water strata, it is used fully as much to distinguish ordinary strata. Thus positive or negative decision to drill for valuable deposits may be made, and, in any event, geological data and proper operation of the drill may be ascertained ahead of the drilling.

Surface electrical prospecting methods before the methods described in this and my aforementioned previous patent application did not differentiate strata, lacked reliable survey at extended depth, and had unwanted surface errors. Even those prospecting methods that detect removed leakages of oil and gas at the surface, are divorced from the oil and gas occurrence itself and subject to the vagaries of infiltration and geology. This invention, however, relates distinctive surface indications of oil, gas and other strata directly to extensive geological strata causing them. Primarily a simple electrical log of the strata, secondarily, as with other structural geophysical methods, a picture of geological structure by comparing electrical logs (correlation), may be obtained.

These advantages were possessed by the methods of my patent application aforementioned, and were there availed of by the expedient of establishing a current introduction of fixed pattern and shift of pick-up to secure from such set-up a record. In the present application the introduction pattern is again established, a fixed pick-up location is established and readings taken, and thereafter the introduction pattern is modified and for each modification a reading or readings taken. If there be surface error at pick-up, in this way it enters equally into all pick-up readings and does not disturb their relative values for plotting. An error present for every value does not change the shape of the electrical log. The "pick-up control configuration," to stabilize the current pattern, hence the equipotential pattern about at right angles to it, while permitting surface shifting of the equipotential lines, saves even more connection cable than did the methods of my aforementioned application. Such a "method within a method," as it might be called, controls for shortened layouts of connection cables on the earth, the pick-up control current pattern or equipotential distribution. Effort in survey is also centered more definitely and made less. Contrary to systems of introducing current not employing this "pick-up control configuration" the basic pattern of flow is not much deranged as surface equipotentials move past pick-up means.

An important unique geophysical feature of my aforesaid previous application, the survey of inaccessible land, as rough, overgrown, marshy, or to an extent, water-covered land, from accessible land nearby, is likewise a feature of this invention.

The objects of the present invention are:

To provide methods for determining by geophysical survey, depth, nature, and thickness of strata underlying the earth surface;

To provide methods of accomplishing such surveys which minimize or eliminate surface errors;

To provide methods of making such surveys at depth which substantially reduce the surface spread necessary and effect resulting savings in cables or other connectors used and handling costs thereof; and otherwise To provide methods for determining by geophysical methods subsurface information at depth and substantially duplicating and thereby checking the information obtained.

The means by which the foregoing and other objects are accomplished and the manner of their accomplishment will readily be understood from the following specification on reference to the accompanying drawings, in which:

Fig. 1 is a plan view of the surface of the ground, showing two spaced electrodes connected to one pole of a source of current, and an electrode spaced at a somewhat comparable distance and connected to the opposite pole of said source, to establish current flow. The view illustrates the current flow lines for approximately equal currents through two like-connected (like-sign) electrodes, and drawn at right angles approximately to the current flow lines are the horizontal traces of the equipotential surfaces. Flow and equipotential pattern resulting from influence of the presence of actual strata beneath, such as is given here, is not much different from the pattern in a theoretical homogeneous medium. Stationary pick-up electrode positions and a movable introduction electrode are illustrated.

Figure 2:
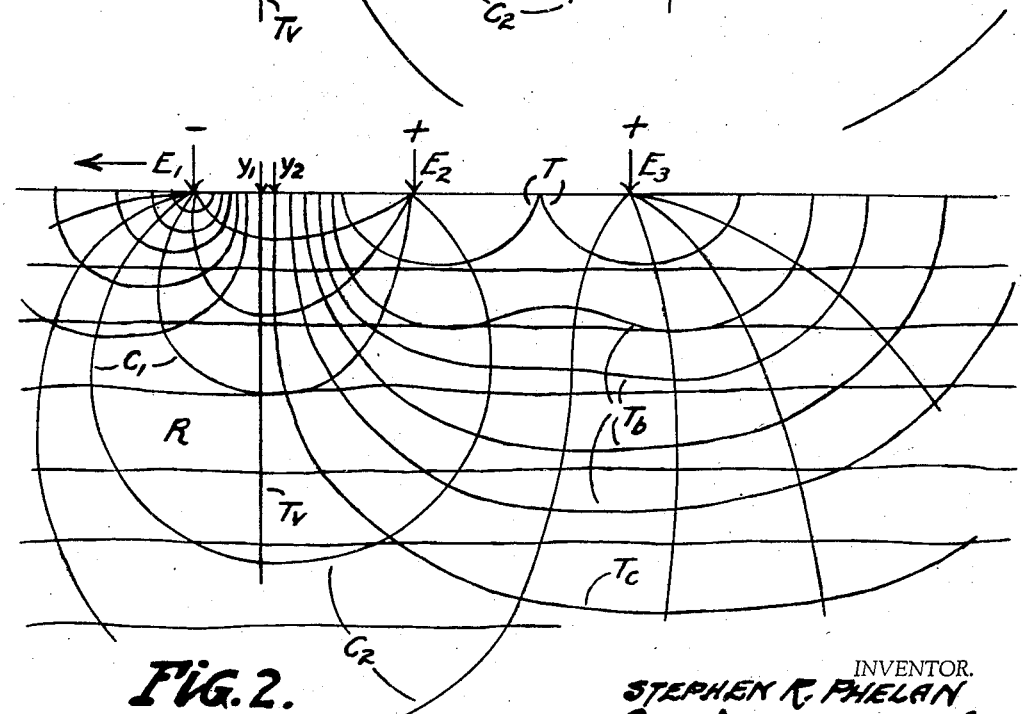

Fig. 2 is an elevation view, showing vertical traces of these flow lines and equipotential surfaces, on a plane passing vertically through the like-connected electrodes. Rather than the theoretical traces given by such flow in a homogeneous medium, this diagram also illustrates flow through actual strata shown. My application, No. 309,177, filed December 14, 1939, now Patent No. 2,314,597, issued March 23, 1943, in all cases, even with strata diagrammed, gave the theoretical distribution of these traces for a homogeneous medium. The more exact pattern has been now given additionally, and may be seen to increase rather than diminish the effects discussed in my previous application. Theoretical homogeneous distribution, however, is sketched for all remaining figures of this invention.

Fig. 3, with the exception of diagramming theoretical homogeneous distribution, is essentially Fig. 2. This figure shows, likewise, three stationary electrodes for ratio pick-up placed at the pick-up locations Y1, Y2, Y3.

Fig. 4 illustrates similarly an arrangement of like-sign electrodes of introduction symmetrical about a center, and having "double wings," or two groups of said electrodes. This diagram shows equalized currents, and preferable location of stationary pick-up.

Fig. 5 substitutes two like-sign electrodes for the inner electrodes of each wing. Currents are balanced as later stated. The four inner electrodes of introduction now comprise a double wing, symmetrical pick-up control configuration. The stationary, ratio pick-up locations are marked at Y1, Y2, Y3, by small arrows.

Figs. 6 and 7, both plan views, show how a multiple arrangement of like-sign introducing electrodes (here three) may be placed, and also two pick-up locations.

Referring now to the drawings in which the various parts are indicated by numerals:

In Figs. 1 and 2, E1, E2, and E3 are locations of electrodes, or other means, introducing current into the earth. The positive (+) and negative (−) signs have been placed above introduction electrode locations to schematically represent their connection to the same or the other pole of a source of current, S. If electrodes are connected to the same positive pole they are marked positive. If to the same negative pole they are marked negative. In all cases, for A. C., D. C., or any special type of current, it does not matter whether these "like-sign" electrodes are positive or negative, but rather that connection be to the same pole. Respective currents through like-sign electrodes at E2 and E3 are essentially equal. The electrodes at E2 and E3 are spaced at a measured distance selected for a desired depth determination, and the electrode at E1 is relatively spaced at a distance from E2 which is sensibly comparable to that between E2 and E3. The vertical arrows E1, E2, etc. of Fig. 2 and all succeeding figures mark the locations of electrodes, or other current introduction means. Pick-up positions for individual electrodes are marked $x$, $x$, in Figs. 1, 6 and 7, and Y1, Y2, Y3, in Figs. 2, 3, 4 and 5. Among a number of ways of moving one or more electrodes, the progressive movement of E1 outward, as shown by an arrow so directed near E1, is often most convenient. To move past such stationary pick-up the preferable equipotential surfaces T$b$, and even the equipotential surfaces, T$c$, some experience in such patterns and condition of flow allows easier placement of pick-up. Location of pick-up should be, as shown, inside of the reference equipotential trace, T$v$, illustrated in Figs. 1 to 5 inclusive. E1 may be moved, therefore, so that the proper equipotential surfaces may always be picked-up.

The spacings shown here between introduction electrodes are in practically a 1 to 1 ratio, and remain not far from this value even with movement of E1. This ratio at the beginning of survey may vary widely, but these surveys are most easily performed with comparable spacings. When the spacing of E1 and E2 is comparably small with respect to that of E2 and E3 (say 1 to 3 or 1 to 5), the equipotential surfaces T$b$ and T$c$ extend beyond E3 more than shown. Use of this extension feature for comparable spacings and small relative spacings, can survey inaccessible areas from accessible areas. This could be called survey by "remote control."

S, (Fig. 1) represents a source of current, A. C., or D. C., or any special type of current. One pole of S is connected in the usual manner by a conductor, 1, to an electrode at E1, this conductor preferably being an insulated wire, and if so, it may be as usual laid along the surface of the earth. With A. C. it is laid along a path removed sufficiently from the desired pick-up locations to remove or diminish any induced currents in the leads to the pick-up instrument. The opposite pole is similarly connected by a conductor, 2, to an electrode at E2, and this electrode is connected by a continuing conductor, 3, to an electrode at E3, though both may be connected to the source pole by individual direct leads. Connection may be made to more than one source, especially with other electrode arrangements, but use of more than one source is not as practical. The respective currents, in leads to like-sign electrodes E2 and E3, may be made approximately equal, by driving electrodes at E2, and E3 in or out of the earth. Equalizing of like-sign electrode currents by means of simple electrical apparatus in one or more of leads 1, 2, 3, is alternative.

The current flow and equipotential patterns, here drawn diagrammatically, indicate the general course of the current flow through strata and the nature of the equipotential surfaces created. Figs. 1 and 2 illustrate actual flow through the strata, R, of Fig. 2. Anisotropy of the deep strata flattens out even more the equipotential surfaces for flow in a theoretical homogeneous medium. In the elevation view, Fig. 2, the equipotential surfaces, T, surrounding individual electrodes, are not spherical, but flattened to ellipsoidal shape. Outside of surfaces, T, the surfaces, Tb, surrounding like-sign electrodes, are relatively flat. The spherical equipotential surfaces, Tc, farther out than the surfaces, Tb, from like-sign electrodes, likewise surrounding them, become flattened similar to the surfaces Tb, though in less amount. Regions of more flattened equipotential surfaces, of course, constitute regions of more nearly parallel and more nearly vertical flow. I especially desire, therefore, to pick up surfaces Tb. The other figures than Figs. 1 and 2, represent the shape of equipotentials in a theoretical homogeneous medium.

In Figs. 1 and 2, flow lines oblique to strata, R, are marked C1, while flow lines more nearly vertical to strata are marked C2. These latter lines determine the important flattened equipotential surfaces, Tb. They are repelled to depth, and have the best distinguishing qualities for strata in the zone of more-flattened equipotential surfaces, Tb.

The surfaces, T, around separate electrodes of introduction have no particular advantages over well-known ellipsoidal surfaces around a single electrode connected to a pole of a source, and are not a novel feature of this invention.

Many schemes for varying the electrode pattern may be employed. Increasing the spacing by shift of all introduction electrodes with fixed pick-up electrodes is one instance. By moving pick-up electrodes in an attenuated flow region along the line of electrodes, together with increasing spacing of introduction electrodes, the pattern may be expanded in a constant ratio. Confining movement, however, to shaft of a single introduction electrode, is most practical in regard to expense and effort. The maintaining of stationary pick-up, to eliminate the effect of surface distortion on the electrical curve or log from pick-up reading, is always preferred. The same error thereby enters into every pick-up reading, and the shape of the curve or log is not greatly affected.

Fig. 3 is not essentially different from Fig. 2. One difference consists of basing the pattern of vertical equipotential traces on theoretical flow through a homogeneous medium. Another difference is in showing that three pick-up electrodes for ratio pick-up may be the type of pick-up.

The elevation view, Fig. 4, shows symmetrical arrangement of two like-sign groups, E0, E1, and E2, E3. They may often be placed in a straight line as along a road. For ready pick-up, the pick-up electrode should be placed near the equipotential surface trace, Tv, also introduction electrode symmetry and equality of currents through each introduction electrode, are advisable. With A. C., because adjustment to equality may prove more difficult than for D. C., adjustment of the penetration of metal rods, such as are often driven into the ground to form electrodes of introduction, is sometimes not sufficient to equalize currents properly. Phase changing by means of simple phase-adjusting devices or simple A. C. network, one or more being placed in the introduction electrode circuits, is then required.

A first set of readings for the fixed pick-up electrodes at Y1, Y2, shown, may be obtained by moving E1 according to the arrow shown. A second set of readings for the same fixed pick-up, after restoring movable electrode at E1, to its original position, comes from moving E2 in the reverse direction. The two sets of readings, nearly always, because they both indicate the same broad formation, hence cannot differ much, check one another in general.

Fig. 5 substitutes the control configuration E12, E11, E21, E22, for E1 and E2 of Fig. 4. Three ratio pick-up electrodes at Y1, Y2, Y3, for connection to a ratio pick-up instrument, rather than two absolute pick-up electrodes for connection to an absolute pick-up instrument, are shown. Currents through electrodes E0 and E3 should be made equal, likewise the total current supplied E12 and E11 should equal this total value of current through E0 and E3. The total current through E21 and E22 should be the same as the total current through E12 and E11. The respective currents through E12, E11, E21, E22, may preferably be made equal.

Figs. 6 and 7 are plan views of arrangements with three like-sign introduction electrodes grouped. More electrodes than three may comprise a group. Like-sign grouping is not necessarily regular or symmetrical, though preferable. The advantages in principle of as many like-sign electrodes as possible per group are obvious, but practical field use requires an economy of electrodes. Fixed pick-up and moving introduction may be by electrodes placed much as before.

In Fig. 6, by moving the electrode E64 by successive increments, indicated by a series of marks X, while maintaining the pick-up station at the points x x, a succession of readings and recordings may be made reflecting the desired information.

In Fig. 7, by moving the electrode 74 similarly a like succession of readings may be made. In this case an opposite movement of electrode E71 may be made and used as a duplicating check on the original readings.

A specific example of survey set-up and procedure is now given. This survey, which is very economical of connection cable, is an electrode arrangement similar to Fig. 3, and in addition includes a pick-up control configuration.

By regular methods of land surveying, five introduction electrodes, and also the pick-up electrodes, are located. In this instance, something of a line of introduction electrodes may be placed along a road, preferably in a somewhat straight line. I employ, generally, electrodes one inch in diameter and often have to drive each several feet into the ground for good electrical contact. The distance of separation of electrodes, particularly of the like-sign electrodes, increases with increasing depth zones to be read. A survey, intended to go to about 2500 feet, employs an overall "spread" of electrodes roughly 2500 feet along the surface. Experience proves that with like-sign introduction of (even A. C.) current, the rule that overall "spread" equals depth is a conservative one.

I usually prefer, additionally, to make two substitutions in the set-up of Fig. 3. Two introduction electrodes, as the electrodes E21, E22, Fig. 5, separated 500 feet are substituted for introduction electrodes at E2. These two, together with the movable electrode at E1, placed at first 400 feet away from the nearest of these two, form the pick-up control configuration. Two more electrodes of introduction separated 500 feet, for purposes of symmetry and some increase of penetration of current, may be substituted for introduction electrode at E3. The separation between the nearest electrodes of the two pairs substituted is, therefore, 2000 feet. These four electrodes of introduction, being like-connected or like-sign electrodes, are connected by a flexible, well-insulated cable laid on the ground between them. A cable equivalent to about No. 16 B. and S. gauge (for strength, as resistance of any fairly large B. and S. wire connection is negligible factor) is best. Connection from the nearest like-sign electrode to the source of current and from the other-sign electrode to the other pole of the said source is now made. To avoid unwanted induction in pick-up leads, from A. C. (or any current varying with time), it is well to lay connection cable to the source around pick-up electrodes, and likewise place the source some distance from pick-up electrodes, see Fig. 1.

As a matter of personal preference I generally use a 500 cycle 100 volt A. C. generator, driven by a gasoline engine, and I send out an ampere or so into the formation. It is advisable, beyond 4000 feet depth, to reduce this 500 cycle frequency of the current for greater depth reached. Some reduction can be made by slowing the revolutions of the driving engine.

Since currents through E2 and E3 of Fig. 3 would have been adjusted to comparative equality for survey, the total current through the two electrodes substituted for the one at E2, now is adjusted to equal the total current through the two electrodes substituted for the one at E3. For symmetry and standard pattern, likewise, it is well to now balance the current between individual electrodes of both these pairs of electrodes. A number of simple electrical ways of adjusting currents to equal balance, which, because of lack of great accuracy of balance required, are easily applied, may be used. I generally make a preliminary D. C. adjustment of all like-sign electrodes to the same resistance by measuring combined resistance on an ohmmeter of each together with that of a common electrode thrust into the ground at a convenient location, and by driving each in or out of the ground. Then after proper connection to the source I adjust the currents through all to the required value. Usually, A. C. or D. C. ammeter readings of respective currents and tapping the electrodes in or out of the earth are sufficient to adjust currents. There are, of course, a number of other ways of adjusting currents. When a more exact balance is desirable, as for the double like-sign set-ups of Figs. 4 and 5, I sometimes include a simple A. C. phase adjusting network in conjunction with introduction electrodes. Although seldom necessary for D. C., a rheostat or so, or a simple resistance network may adjust introduction-electrode currents.

The locating and marking of positions for pick-up electrodes, at the same time and with the same land survey instruments as for introduction electrodes, is preferably in line with the introduction electrodes and between the two electrodes of unlike-sign nearest each other. There is, of course, no reason other suitable locations may not be chosen. The pick-up electrodes are of the same kind as introduction electrodes, and especially good contact with the earth is desirable for them. By ohmmeter and common electrode, as before described, or by any other simple approximate electrical method, their respective resistances to earth may be made low and about equal, with some benefit. In rare cases, driving them into the earth should be supplemented by watering them. For electrode set-ups symmetrical about a center, as Figs. 4 and 5, the proper spotting of pick-up electrodes is easy, but in such a set-up as this the spotting must be such as to permit shifting of the desired surface pick-up equipotentials past pick-up electrodes. For 500 cycle A. C. and this set-up, the center between pick-up electrode locations was spotted at about 250 feet from the like-sign introduction electrode, at E2. Experience with other conditions than these allows pick-up to be readily spotted. The pick-up electrodes, if two in number, require an absolute measuring instrument, such as a V. T. voltmeter, cathode ray oscillograph, or sensitive meter; or a comparison measuring instrument such as a potentiometer. With ratio pick-up, which is frequent, three electrodes and a ratio bridge instrument are required. There are, of course, other forms of pick-up means than the pick-up electrode arrangements and instruments given here, and among different other means of picking up the effects created by current flow from like-sign electrodes in depth may be a search coil or coils with absolute, comparison, or ratio instruments. Such exploratory coils hence pick up quantities of the electromagnetic field, much as electrodes do. Concerning separation of pick-up electrodes from each other, different distances, depending on the set-up and depth detail desired, may be used. For this survey, I preferred ratio pick-up, and I spaced three pick-up electrodes fifteen feet from each other. It is possible to employ unequal spacings but the spacings are preferably equal.

After reading pick-up with movable electrode E1 at 400 feet from the nearest like-sign electrode, the electrode E1 is shifted an equal interval, a second pick-up reading made, and the operations repeated as desired. At each set-up, the electrode is driven into the ground to about the same depth. Reading of pick-up instrument can be made for each position of the movable electrode. It is well to "spot" (or locate and mark) beforehand during the preliminary land survey the positions to be occupied by E1. A progressive movement inward or outward of the movable electrode, with closer progression where desired, is more usual. Different schemes of moving electrodes, for instance expanding the lay-out pattern of the electrodes shown in Fig. 7 by moving two thereof equally away from each other and from the third, are possible, and have certain advantages, but require much more time and expense. These readings obtained by progressive movement represent a succession of readings in depth, and may be plotted to thus log the strata as a curve or graph. In effect, the surface equipotential pattern is moved progressively past the pick-up electrodes. Very much the same error of surface distortion at pick-up enters into all readings.

I claim:

A method of geophysically exploring subsurface earth structures which includes establishing a source of current, and a pair of spaced groups of current introduction centers, each group comprising a plurality of individual centers widely spaced apart, connecting one pole of said source to all the said centers of one said group, and the opposite pole to all the said centers of the other said group to establish current flow; establishing a pick-up station in the area of jointly induced potentials about one said group, and making pick-up readings and recordings from currents induced by said flow, and subsequently successively singly disconnecting the centers of one said group from, and restoring them to connection with, said source to vary the pattern of the potentials induced by said group and making at said station additional readings and recordings during each said disconnection.

STEPHEN R. PHELAN.